(No Model.)
T. E. WILSON.
HANDLE FASTENER.
No. 585,857.　　　　　　　Patented July 6, 1897.
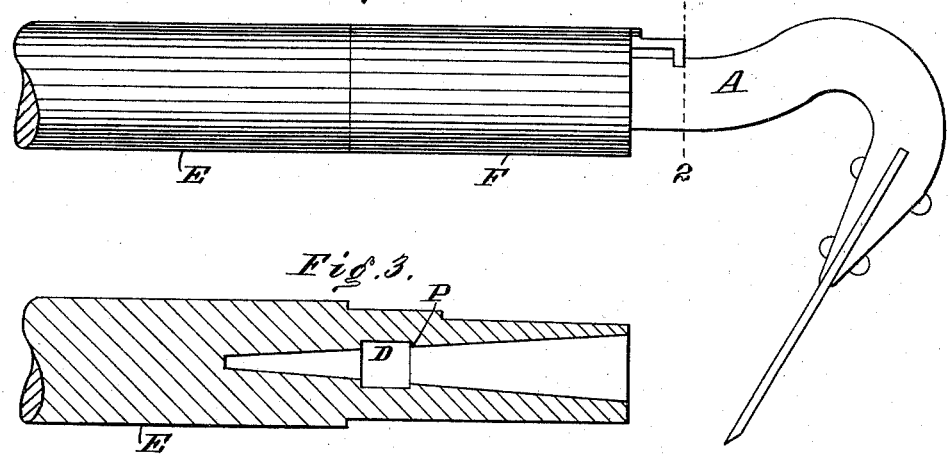
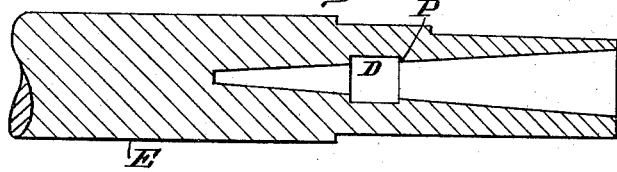
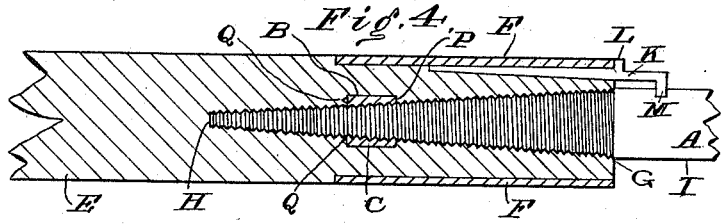
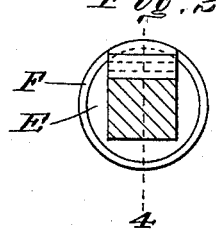
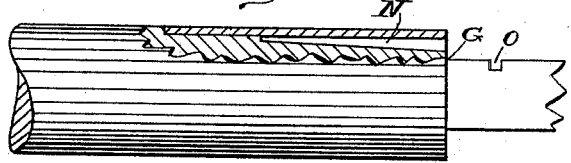
Witnesses　　　　　Thomas E. Wilson, Inventor
　　　　　　　　　By Benton Crafts, Attorney
THE NORRIS PETERS CO., PHOTO-LITHO., WASHINGTON, D. C.

UNITED STATES PATENT OFFICE.

THOMAS E. WILSON, OF FARMLAND, INDIANA.

HANDLE-FASTENER.

SPECIFICATION forming part of Letters Patent No. 585,857, dated July 6, 1897.

Application filed March 11, 1897. Serial No. 626,953. (No model.)

*To all whom it may concern:*

Be it known that I, THOMAS E. WILSON, a citizen of the United States, residing at Farmland, in the county of Randolph and State of Indiana, have invented a new and useful Improvement in Handle-Fasteners, of which the following is a specification.

My improvement in handle-fasteners relates to all implements having a shank to which suitable handles may be attached—such as pitchforks, hoes, rakes, knives, &c.—which, by the mechanism I employ, enables the ready and secure attachment of an implement having a shank to a handle without the employment of skilled labor, making a better attachment for all purposes than skilled labor could heretofore effect and so fastening the handle to the implement that it may easily be separated from same without injury to parts, thus rendering the handles to various different implements interchangeable. I attain these results by the methods and mechanism shown in the accompanying drawings, in which—

Figure 1 is a side view showing shank A in place; Fig. 2, a section on line 1 2 of Fig. 1; Fig. 3, a sectional view showing the shape of hole and recess in handle formed to receive shank and seminuts; Fig. 4, a section on line 3 4 of Fig. 2; Fig. 5, an end view of seminuts; Fig. 6, a section showing recess for key.

Similar letters refer to similar parts throughout the several views.

Two semicircular metal nuts B and C, shaped to conform to the circular recess in the hole in the handle, have threads cut on their inner concaves and are adapted to be screwed on the conical shank A. They are provided with teeth Q Q, adapted to be forced into the wood to prevent their turning with the shank. The handle E is provided with a ferrule F, and when the seminuts B and C are placed within the recess D, their interior screw-threaded surfaces inward, and the threaded shank integrally connected with the implement to be used is screwed within and between them, they are pressed outward with great force, which pressure is resisted by the ferrule, thus firmly securing the shank within the handle, the shoulder P, in contact with the flat sides of the seminuts, locks the shank so that it cannot be removed except by unscrewing it.

The shank is round from the point G to the point H and preferably square from G to I. A key K, of elastic metal, having an upward-projecting lug L, is shaped to be driven into the recess N, the lug M engaging the lower flat surface and sides of the notch O, and the lug L serving to keep the ferrule in place, while the lug M prevents the shank from being turned. The key is readily removed by prying the lug M upward, disengaging it from the notch O, when the shank may be turned, unscrewed, and removed from the handle.

What I claim as of my invention, and desire to secure by Letters Patent, is—

In a handle-fastener of the class described, the conical shank as described, provided with a notch, O the shank adapted to be made fast and firmly secured within the handle by its screw forcing the semicircular nuts into the recess provided in the hole in the handle, imparting their force against the resisting ferrule, as described; in combination with the key K of elastic metal, adapted to be forced into the recess N and having a lug L engaging with the ferrule, as described, and having a lug M engaging with the notch in the shank, preventing the shank from being turned while so engaged, as described, and shown, and for the uses and purposes set forth.

THOMAS E. WILSON.

Witnesses:
A. J. PURSLEY,
M. L. HARRIS.